(12) United States Patent
Zeng (10) Patent No.: US 8,775,063 B2
(45) Date of Patent: Jul. 8, 2014

(54) SYSTEM AND METHOD OF LANE PATH ESTIMATION USING SENSOR FUSION

(75) Inventor: Shuqing Zeng, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 704 days.

(21) Appl. No.: 12/688,965

(22) Filed: Jan. 18, 2010

(65) Prior Publication Data

US 2010/0191461 A1    Jul. 29, 2010

Related U.S. Application Data

(60) Provisional application No. 61/147,461, filed on Jan. 26, 2009.

(51) Int. Cl.
*G08G 1/16* (2006.01)

(52) U.S. Cl.
USPC ............ 701/301; 701/1; 701/96; 701/23; 701/536; 342/107; 342/59; 342/90; 708/300

(58) Field of Classification Search
CPC ............ G06K 9/00798; G06K 2009/484; G06K 2209/23; B60W 2550/143; B60W 2550/302; B60W 30/12; B60W 30/16; B60T 2201/08

USPC ............ 701/208, 96, 536, 117, 468; 708/300
See application file for complete search history.

(56) References Cited

U.S. PATENT DOCUMENTS

| | | | |
|---|---|---|---|
| 6,718,259 B1 * | 4/2004 | Khosla ........................ 701/536 |
| 7,216,023 B2 * | 5/2007 | Akita .............................. 701/41 |
| 7,460,951 B2 * | 12/2008 | Altan et al. ................... 701/536 |
| 2003/0195703 A1 * | 10/2003 | Ibrahim ....................... 701/301 |
| 2010/0191461 A1 * | 7/2010 | Zeng ........................... 701/208 |

OTHER PUBLICATIONS

U.S. Appl. No. 12/689,279, Shuqing Zeng.

* cited by examiner

*Primary Examiner* — M. Thein
*Assistant Examiner* — Milena Racic (57) ABSTRACT

A method for estimating a projected path of travel for a vehicle on a road includes monitoring a plurality of sensor inputs, determining a road geometry in front of the vehicle based upon the monitored sensor inputs, determining a vehicle position in relation to the road geometry based upon the monitored sensor inputs, determining a plurality of particle points in front of the vehicle representing a potential path of travel from the road geometry and the vehicle position, and utilizing iteratively determined ones of the plurality of particle points to navigate the vehicle including omitting ones of the plurality of particle points passed by the vehicle.

18 Claims, 7 Drawing Sheets

SYSTEM AND METHOD OF LANE PATH ESTIMATION USING SENSOR FUSION

CROSS REFERENCE TO RELATED APPLICATIONS

This application claims the benefit of U.S. Provisional Application No. 61/147,461 filed on Jan. 26, 2009, which is incorporated herein by reference.

TECHNICAL FIELD

This disclosure is related to road and lane geometry detection in a vehicle.

BACKGROUND

The statements in this section merely provide background information related to the present disclosure and may not constitute prior art.

Vehicles may be equipped with various sensing devices and systems that assist a vehicle operator in managing vehicle operation. Such sensors can be utilized to describe an operating environment of the vehicle. One type of sensing system is intended to identify lane geometry and estimate a vehicle position and orientation with relation to the lane. Global positioning devices (GPS) or three dimensional (3D) map devices are useful to place a vehicle at an approximate location with relation to a map. However, GPS devices are known to include positional error, low sample rates, and large lag times in response to dynamic movement of the vehicle. Such systems are useful for general navigation, but are not well adapted in isolation to provide input for vehicle operation. Exemplary systems employ sensors, such as vehicle kinematic sensors and camera systems, to position a vehicle within a lane and may work in conjunction with a GPS device.

Information regarding lane geometry and vehicle position and orientation in relation to the lane can be generated simultaneously from a number of sources. Fusion of this information into estimations of lane and vehicle data can be accomplished by a number of methods known in the art. However, many such methods utilize historical tracks and map estimations to generate estimations of lane geometry and vehicle position and orientation in relation to the lane. Additionally, many methods utilize Gaussian distribution in calculations to account for unknown trends. One having ordinary skill in the art will appreciate that estimations based upon historical data and Gaussian distribution are not responsive to quick changes in inputs and generally include a lag factor.

SUMMARY

A method for estimating a projected path of travel for a vehicle on a road includes monitoring a plurality of sensor inputs, determining a road geometry in front of the vehicle based upon the monitored sensor inputs, determining a vehicle position in relation to the road geometry based upon the monitored sensor inputs, determining a plurality of particle points in front of the vehicle representing a potential path of travel from the road geometry and the vehicle position, and utilizing iteratively determined ones of the plurality of particle points to navigate the vehicle including omitting ones of the plurality of particle points passed by the vehicle.

BRIEF DESCRIPTION OF THE DRAWINGS

One or more embodiments will now be described, by way of example, with reference to the accompanying drawings, in which.

DETAILED DESCRIPTION

Figure 1:
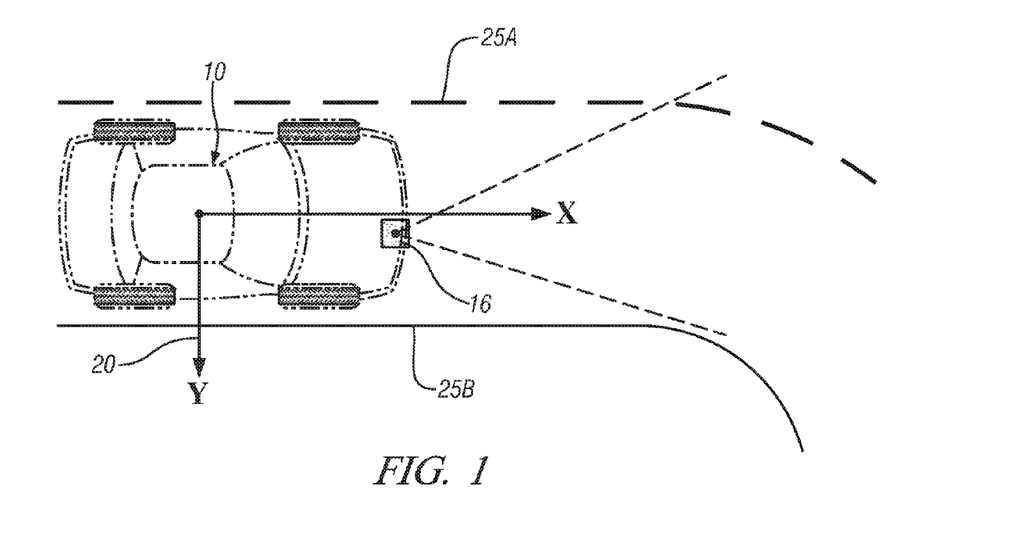
FIG. 1 depicts an exemplary vehicle utilizing a sensor to acquire road geometry data in front of the vehicle, in accordance with the present disclosure.

Referring now to the drawings, wherein the showings are for the purpose of illustrating certain exemplary embodiments only and not for the purpose of limiting the same, FIG. 1 depicts an exemplary vehicle utilizing a sensor to acquire road geometry data in front of the vehicle, in accordance with the present disclosure. The exemplary vehicle includes a passenger vehicle intended for use on highways, although it is understood that the disclosure described herein is applicable on any vehicle or other system to monitor position and trajectory of remote vehicles and other objects. The vehicle includes a control system containing various algorithms and calibrations executed at various times. The control system is preferably a subset of an overall vehicle control architecture which provides coordinated vehicle system control. The control system monitors inputs from various sensors describing the operating environment of the vehicle, synthesize pertinent information and inputs, and execute algorithms to control various actuators to achieve control targets, including such parameters as collision avoidance and adaptive cruise control. The vehicle control architecture includes a plurality of distributed processors and devices, including a system controller providing functionality such as antilock braking, traction control, and vehicle stability.

In the exemplary embodiment of FIG. 1, vehicle 10 is depicted and includes a vision subsystem 16. Vision subsystem 16 utilizes a camera or an imaging device capable of creating a digital image representation of the area in front of the vehicle. The data from vision subsystem 16 is utilized to describe conditions in front of the vehicle and is translated into an XY-coordinate system 20 in reference to the central axis of vehicle 10. An exemplary field of view for the vision subsystem is illustrated by the dotted lines. A lane of travel on the road is depicted according to lane markers 25A and 25B and common features can be detected visually and utilized to describe lane geometry relative to vehicle 10. In this way, by methods known to one having ordinary skill in the art, information gained from the analysis of image or camera data can be utilized as conditions relative to the forward travel of vehicle 10.

Each processor may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Sensors utilized by vehicle 10, such as a vision subsystem 16 or other radar or ranging device, are preferably positioned within the vehicle 10 in relatively unobstructed positions relative to a view in front of the vehicle. It is also appreciated that each of these sensors provides an estimate of actual details of the road or objects on the road in front of the vehicle. It will be appreciated that these estimates are not exact locations, and standards of deviation for each estimate are possible. It is further appreciated that the characteristics of these sensors are complementary, in that some are more reliable in estimating certain parameters than others. Conventional sensors have different operating ranges and angular coverages, and are capable of estimating different parameters within their operating range. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of the object. Scanning type LIDAR performs efficiently and accurately with respect to estimating range, and azimuth position, but typically cannot estimate range rate, and is therefore not accurate with respect to new object acquisition/recognition. Ultrasonic sensors are capable of estimating range but are generally incapable of estimating or computing range rate and azimuth position. Sensors describing kinematics of the vehicle such as velocity and yaw rate are not exact, and in particular, are known to be poor at tracking small changes in vehicle motion. Further, it is appreciated that the performance of each sensor technology is affected by differing environmental conditions. Thus, conventional sensors present parametric variances, whose operative overlap creates opportunities for sensory fusion.

Sensors and subsystems describing the operating environment in front of the vehicle typically provide an output including range, R, time-based change in range, R_dot, and angle, Θ, preferably with respect to a longitudinal axis of the vehicle, which can be written as a measurement vector (°), i.e., sensor data. An exemplary short-range radar subsystem has a field-of-view (FOV) of 160 degrees and a maximum range of thirty meters. An exemplary long-range radar subsystem has a field-of-view of 17 degrees and a maximum range of 220 meters. An exemplary forward vision subsystem has a field-of-view of 45 degrees and a maximum range of fifty (50) meters. For each subsystem the field-of-view is preferably oriented around the longitudinal axis of the vehicle 10. The vehicle is preferably oriented to a coordinate system, referred to as an XY-coordinate system 20, wherein the longitudinal axis of the vehicle 10 establishes the X-axis, with a locus at a point convenient to the vehicle and to signal processing, and the Y-axis is established by an axis orthogonal to the longitudinal axis of the vehicle 10 and in a horizontal plane, which is thus parallel to ground surface.

A preferred control module includes a controller, wherein an algorithm and associated calibration are stored and configured to receive the estimate data from available sensors to cluster data into usable estimations of conditions in front of the vehicle, and to fuse the clustered observations to determine required lane geometry and relative vehicle position estimates. It is understood that fusing data using different sensing systems and technologies yields robust results. Again, it is appreciated that any number of sensors can be used in this technique.

One method to create and maintain estimates of road and lane geometry within a system is given wherein historical measurements are utilized to evaluate or predict subsequent track data. Exemplary systems make estimates based upon functions at time T to describe a system state at time T+1. Frequently, in order to support real-time estimation, an information array to present a Gaussian distribution is used to estimate effects of unknown error. Such systems enable collection and fusion of estimations of road conditions in front of the vehicle.

The above described method to create and maintain estimates of conditions in front of the vehicle is useful to quickly and efficiently generate estimates useful in schemes requiring an approximate vehicle location. However, it will be appreciated by one having ordinary skill in the art that estimates utilizing historical data and Gaussian distribution include inherent error based upon averaging and normal distribution assumptions. For example, in a lane geometry estimation operation, establishing an estimated safe projected path of travel for the vehicle to traverse, a straight lane behind a vehicle has no actual lessening impact on a sharp turn in the road in front of the vehicle. Divergence of data regarding the lane in front of the vehicle is not necessarily improved by application of a random vector with Gaussian distribution to resolve the divergence. Methods utilizing historical averaging and normalized or Gaussian distributions, such as methods relying upon Kalman filters, frequently include an error factor resulting in time lag to changes or transitions in road geometry.

A method is disclosed to generate estimates of lane geometry and vehicle position including orientation in relation to the lane without incurring errors based upon historical data or normalized distributions by fusing current measurements from a plurality of data inputs. An exemplary embodiment includes inputs of GPS data, a vision camera subsystem, and vehicle kinematics. It will be appreciated that lane geometry and vehicle position with relation to the lane geometry can be based upon the same set of data, or distinct sources of data can be utilized to determine the lane geometry and the vehicle position.

General road geometry is information that has been made readily available through the use of GPS devices and 3D maps. Given an approximate location from the GPS device, localized road geometries can be rendered into a list of road shape points. Similarly, GPS coordinates including a global latitude measurement and a global longitude measurement are available through the GPS device. Additional mapping embodiments may include vehicle-to-infrastructure and vehicle-to-vehicle communication systems configured to transmit and receive mapping data and road geometry from ground-based monitoring systems and other vehicles. Vehicle kinematics including at least vehicle speed and yaw rate are available through sensors monitoring vehicle operation and/or monitoring accelerometer readings. Camera data is available for localizing the vehicle to an actual lane of travel. Lane sensing coefficients are defined through camera data (i.e., $y=a+bx+cx^2$, where x is the lane longitudinal offset, and y is the lateral offset from the lane center). Through this data, the forward lane estimation module may estimate the curvature of the lane, lateral offset from the lane center, and vehicle orientation with respect to the tangent of the lane.

Figure 2:
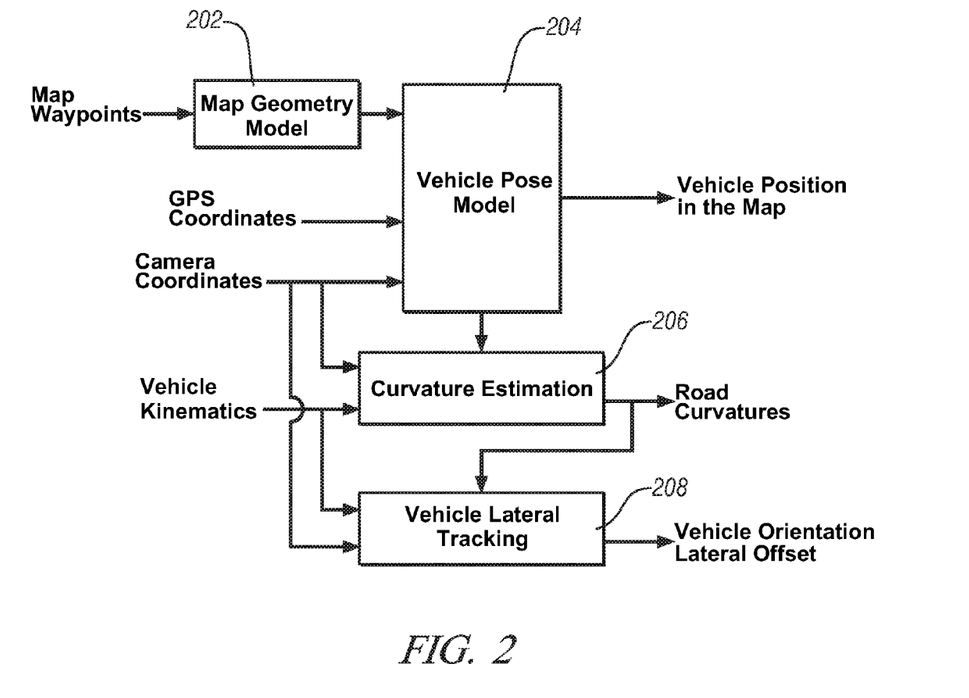
FIG. 2 illustrates an exemplary process whereby sensor inputs can be utilized to generate estimates of lane geometry and vehicle position in relation to the lane, in accordance with the present disclosure.

Methods utilizing sensor data can be utilized to determine a road geometry and a vehicle position in relation to the road geometry. Based upon these determined values, navigational commands for the vehicle can be generated to control the vehicle upon the road surface. Such navigational commands can include a number of exemplary embodiments. FIG. 2 illustrates an exemplary process whereby sensor inputs can be utilized to generate estimates of lane geometry and vehicle position in relation to the lane, in accordance with the present disclosure. The exemplary process includes a map geometry model module 202, a vehicle pose localization module 204, a curvature estimation module 206, and a vehicle lateral tracking module 208. The map geometry model 202 module inputs map waypoints, determined by methods known in the art including determining generalized paths from a starting or present point to a destination or through point in a map database, and outputs a lane geometry in the area of the vehicle. This lane geometry can be described as an arc including a geometric representation of the roads in the area. The vehicle pose localization module 204 inputs the lane geometry from the map geometry model module, GPS coordinates from a GPS device, and camera data from a vision subsystem and outputs an estimated vehicle position in relation to the lane geometry in the area of the vehicle. This vehicle position in relation to the lane geometry or the arc can be described as an arc length parameter ($s_m$). The curvature estimation module 206 inputs camera data, vehicle kinematics data, such as vehicle speed and yaw rate, from vehicle sensors, and $s_m$, and outputs a curvature (K) or a measure of a curve in the road at the location of the vehicle. Finally, the vehicle lateral tracking module 208 inputs camera data, vehicle kinematics data, and K and outputs data regarding the position of the vehicle with respect to the center of the current lane and the angular orientation of the vehicle with respect to the present forward direction of the lane. In this way, present inputs relating to the current position and travel of the vehicle can be utilized to generate data related to the lane geometry in the area of the vehicle and the position and orientation of the vehicle in relation to the lane.

Figure 3:
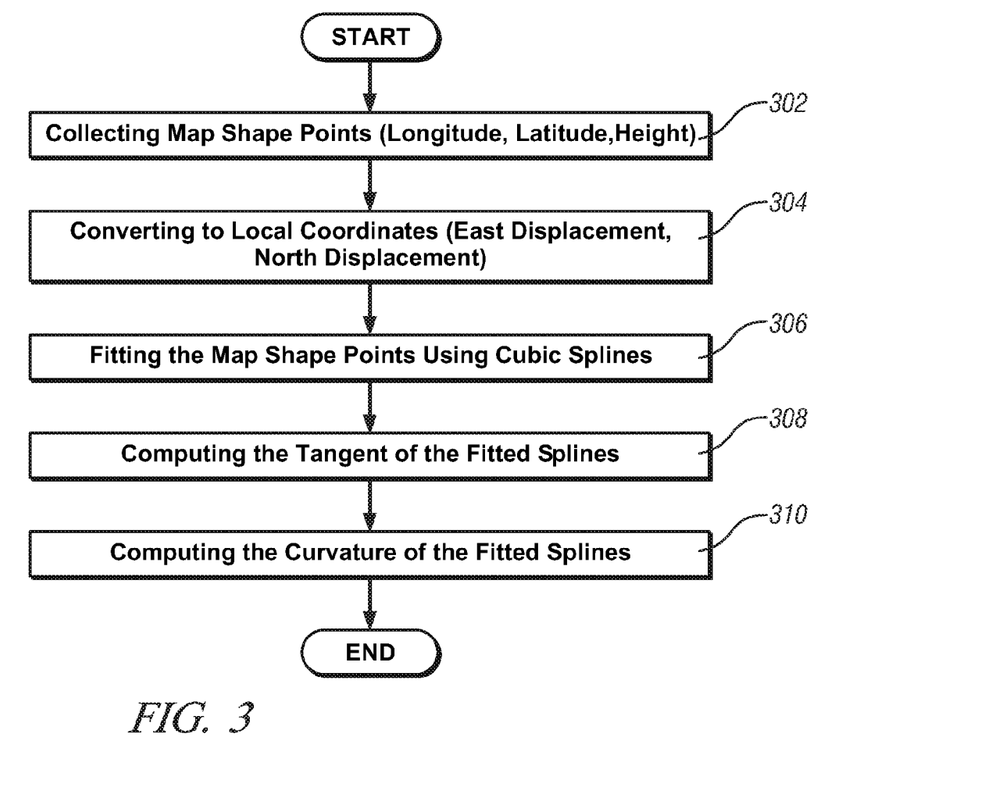
FIG. 3 depicts an exemplary process wherein information from a map database can be utilized to construct a geometric model of a road in an area of a vehicle, in accordance with the present disclosure.

As described above, the map geometry model module inputs map waypoints and outputs a lane geometry in the area of the vehicle. In particular, the map geometry model monitors the input of map shape points as described within a map database and constructs a geometric model representing the shape points. FIG. 3 depicts an exemplary process wherein information from a map database can be utilized to construct a geometric model of a road in an area of a vehicle, in accordance with the present disclosure. The exemplary process includes collecting map shape points describing road geometries from a map database 302. A map database supplies map shape points in global coordinates, frequently describing positions in terms of a latitudinal position, a longitudinal position, and a height or elevation. The global coordinates are then converted to a local coordinate system, usually identifying a point proximate to the vehicle location as a static reference point and describing any other locations as a north displacement from the reference point, i.e., longitudinal displacement, and an east displacement from the reference point, i.e., latitudinal displacement 304. Next the map shape points are fitted with a spline in order to generate a geometric shape or arc approximating the geometry of the roads being represented 306. Finally, a tangent and a curvature of the fitted splines are determined at an estimated position of the vehicle 308 and 310.

An exemplary determination within a map geometry model is described. Let $\{(lat_i, lon_i) | i=1, \ldots, N\}$ be the shape points. Picking a point as the reference point, one can convert the shape points to local coordinates $\{(e_i, n_i) | i=1, \ldots, N\}$, representing the east and north displacements from the reference point. Defining the series $\{(s_i, e_i, n_i) | i=1, \ldots, N\}$ with $$s_1 = 0, s_i = \sum_{k=2}^{i} \sqrt{e_k^2 + n_k^2}, i \geq 2$$

a two-dimensional cubic spline function is obtained to fit the shape points as follows:

$$\begin{bmatrix} e \\ n \end{bmatrix} = f(s) \quad [1]$$

where s is the arc length parameter, e and n are the east and north components of the displacements, respectively. Then the gradient vector at s is computed as follows.

$$\begin{bmatrix} e' \\ n' \end{bmatrix} = f'(s) \quad [2]$$

And, the orientation angle $\xi$ is computed as follows.

$$\xi = \text{atan } 2(n', e') \quad [3]$$

In the end, the curvature κ at s can be computed as follows:

$$\kappa = \frac{e' n'' - n' e''}{(e'^2 + n'^2)^{3/2}} \quad [4]$$

$$\text{where } \begin{bmatrix} e'' \\ n'' \end{bmatrix} = f''(s).$$

As described above, the vehicle pose localization module 204 inputs the lane geometry from the map geometry model module 202, GPS coordinates from a GPS device, and camera and outputs an estimated vehicle position in relation to the lane geometry in the area of the vehicle. One having ordinary skill in the art will appreciate that a problem can be described of localization in a map to monitored GPS data. Map geometry is represented by a spline function, such as the function described in Equation 1. This spline describes discreet locations wherein a lane of a road is said to exist. A point measured by GPS data is returned in an exemplary form $$P = \begin{bmatrix} x \\ y \end{bmatrix}.$$

Inaccuracy and imprecision of some deviation is normal in GPS devices. Error is also inherent in the spline function. P is rarely precisely coincident with the map geometry spline. The spline function describes a point in the lane, for example the center of the lane, and the actual vehicle position will frequently deviate from the center of the lane by a measureable amount. An approximate location of the vehicle on a map must be determined based upon P and the estimated road geometry in the area. One exemplary solution to correct deviation between P and the geometric representation of the road is to find the closest $[e_m, n_m]^T = f(s_m)$ such that $$s_m = \arg\min_s \|P - f(s)\|.$$

This exemplary process is useful to approximate $s_m$ and may be applied iteratively to find the vehicle location in a road curve and improve the estimated location as monitored data changes.

Figure 4:
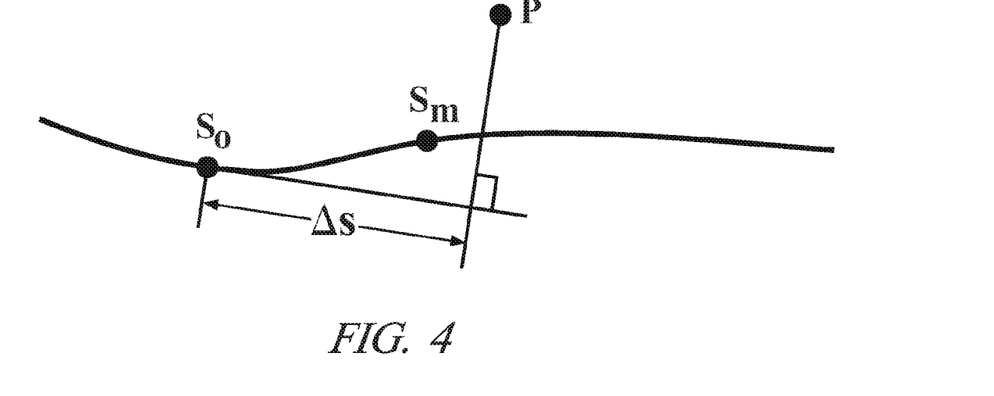
FIG. 4 graphically illustrates an exemplary iterative method to find an approximate location of a vehicle with respect to an estimated road geometry, in accordance with the present disclosure.

FIG. 4 graphically illustrates an exemplary iterative method to find an approximate location of a vehicle with respect to an estimated road geometry, in accordance with the present disclosure. Let $s_0$ be the initial guess of $s_m$. The correction of arc length parameter can be written as follows:

$$\Delta s = \frac{(P - P_m)^T P'_m}{\|P'_m\|} \quad [5]$$

where $P_m = f(s_0)$ and $P_m' = f'(s_0)$. In other words, the correction $\Delta s$ is the projection on unit vector of the gradient at the guess location $s_0$.

As will be appreciated by one having ordinary skill in the art, GPS measurements are not updated frequently as compared to typical in vehicle sensor readings. An exemplary refresh rate of 1 Hz for most on-vehicle GPS receivers is common. Additionally, updates are not always received and may be noisy in urban regions or other areas wherein view of satellite signals is obscured. Filtering techniques can be utilized to compensate for the slow rate of GPS signal updates.

An exemplary vehicle pose localization module utilizes a Kalman filter. The vehicle pose is modeled as a vector and consists of east displacement (e), north displacement (n), orientation with respect to lane (Φ), and the arc length (s). Due to inertia, the vehicle pose does not change abruptly. Therefore the following constant-turning model is assumed:

$$e' = e + v \cos(\phi + \xi)\Delta T + w_1$$

$$n' = n + v \sin(\phi + \xi)\Delta T + w_2$$

$$\phi' = \phi + \omega\Delta T = \kappa\Delta T + w_3$$

$$s' = s + v\Delta T \quad [6]$$

where v is the vehicle speed; ω is the vehicle yaw rate; ΔT is the delta time from the previous cycle; ξ is the current orientation of the road (c.f., (2)); κ is the current curvature of the road based on map curve; $w_1$, $w_2$, and $w_3$ are process noise term representing un-modeled disturbance.

Figure 5:
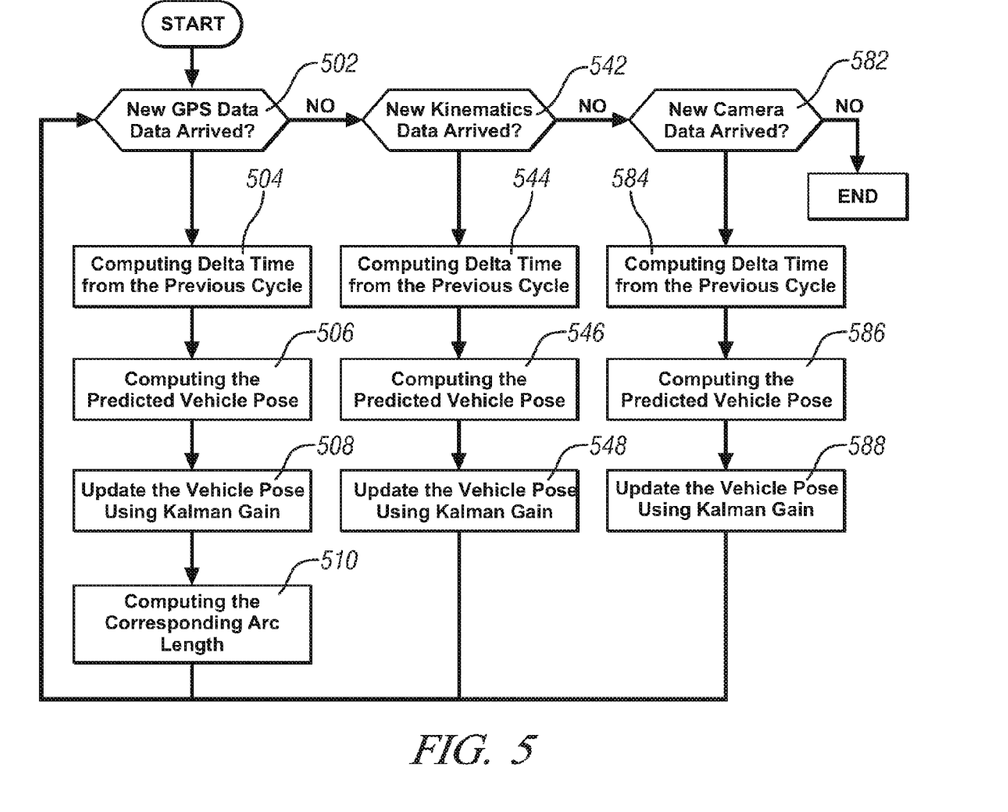
FIG. 5 depicts an exemplary vehicle pose localization process, in accordance with the present disclosure.

FIG. 5 depicts an exemplary control scheme for the vehicle pose localization module 204, in accordance with the present disclosure. The control scheme is illustrated in FIG. 5, and described herein as including discrete elements. Such illustration is for ease of description and it should be recognized that the functions performed by these elements may be combined in one or more devices, e.g., implemented in software, hardware, and/or application-specific integrated circuitry. As described herein above, the vehicle pose localization module 204 inputs the lane geometry from the map geometry model module 202, GPS coordinates from a GPS device, and camera data from a vision subsystem and outputs an estimated vehicle position in relation to the lane geometry in the area of the vehicle.

Vehicle position is iteratively updated whenever new data from GPS, vehicle kinematic sensors, or camera devices is monitored at steps 502, 542, and 582, respectively. After the new data is monitored, a delta time ΔT is computed describing a change in time between vehicle position updates at steps 504, 544, and 584. The delta time ΔT is computed from the difference of timestamps between the current and previous cycles. Exemplary cycle times for the different data sources include 1 second for the GPS data, 20 ms for kinematics data, and 50 ms for camera data. Then the predicted vehicle pose is computed using Equation 5. When GPS data is available, vehicle position is updated using a Kalman filter 508. The measurement updates for vehicle pose is determined using the following GPS measurement equations:

$$e_{gps} = e + k_1 \quad [7]$$

$$n_{gps} = n + k_2 \quad [8]$$

where ($e_{gps}$, $n_{gps}$) is the GPS measured location of the vehicle; $k_1$ and $k_2$ are the measurement noise. After update of vehicle pose using GPS measurement, we compute the correct arc length parameter (s) using Equation 5. This step is important to obtain correct K and ξ values by removing the accumulated error caused by dead reckoning processing in Equation 6.

When new kinematics data is available, a predicted vehicle position may be determined using one of multiple methods 546. A first method includes interpolating a future position based upon delta time and vehicle trajectory. A second method for predicting a vehicle position includes analyzing proximate map points and vehicle position. Let $P_m$ be the point on the map curve with the closest distance to the current vehicle position expressed by P=(e,n). Let vector m denote the normal of the map curve at $P_m$. Then the perpendicular distance d can be expressed as $d=(P-P_m)^T m$, where the normal m is computed as:

$$m = \begin{bmatrix} 0 & -1 \\ 1 & 0 \end{bmatrix} \begin{bmatrix} e^t \\ n^t \end{bmatrix}.$$

Vehicle position is then updated using a Kalman filter 548.

When new camera data is available, a predicted vehicle position is determined 586 and vehicle position is updated using a Kalman filter 588. The predicted vehicle position is determined using the following measurement equations and the Kalman filter:

$$a = d + k_3 \quad [9]$$

$$b = \phi + k_4 \quad [10]$$

where a and b are camera lane sensing parameters; d is the perpendicular distance of the current vehicle position to a center of a lane of travel; φ represents vehicle orientation with respect to a lane of travel; and $k_3$ and $k_4$ are the un-modeled measurement noise.

As described above, the curvature estimation module 206 inputs camera data, vehicle kinematics data, such as vehicle speed and yaw rate, from vehicle sensors, and arc length parameter $s_m$ and outputs a fused curvature ($K_{fus}$) describing a measure of a curve in the road. Once the vehicle is localized in the map curve represented by s, one can find the corresponding map curvature $K_{map}$ by Equation 4.

One notices that there are three sources of information to estimate the road curvature: map curvature ($K_{map}$), camera curvature ($K_{cam}$=2c), yaw rate based curvature ($K_{yaw}$=ω/v). Curvature data used from one of the sources of information can be used to estimate particle points for a projected path of travel for the vehicle. For example, map curvature data can be used to estimate a first projected path of travel for the vehicle. Each separate source of information, e.g., camera curvature and yaw rate based curvature, can be used separately to estimate additional projected paths of travel for the vehicle. The particle points in the projected paths of travel may be fused together to generate a single projected path of travel for navigation of the vehicle.

Multiple methods are envisioned for fusing particle points. A first method includes fusing the particle points using a least squares estimation analysis. An exemplary method is herein described to fuse the abovementioned curvatures together. Let $\kappa_{fus}$ denote the fused curvature with the variance $\sigma_{fus}^2$. Let $\sigma_{map}^2$, $\sigma_{yaw}^2$, and $\sigma_{cam}^2$ denote the variance of the map curvature, yaw rate base curvature, and camera curvature, respectively. We have the following update equations.

When map curvature estimate is available, then $$\kappa_{fus} = \frac{\sigma_{map}^2 \kappa_{fus} + \sigma_{fus}^2 \kappa_{map}}{\sigma_{map}^2 + \sigma_{fus}^2}, \qquad [11]$$

and $$\kappa_{fus} = \frac{\sigma_{map}^2 \sigma_{fus}^2}{\sigma_{map}^2 + \sigma_{fus}^2} \qquad [12]$$

When yaw rate curvature estimate is available, then $$\kappa_{fus} = \frac{\sigma_{yaw}^2 \kappa_{fus} + \sigma_{fus}^2 \kappa_{yaw}}{\sigma_{yaw}^2 + \sigma_{fus}^2}, \qquad [13]$$

and $$\kappa_{fus} = \frac{\sigma_{yaw}^2 \sigma_{fus}^2}{\sigma_{yaw}^2 + \sigma_{fus}^2}. \qquad [14]$$

When camera curvature estimate is available, then $$\kappa_{fus} = \frac{\sigma_{cam}^2 \kappa_{fus} + \sigma_{fus}^2 \kappa_{cam}}{\sigma_{cam}^2 + \sigma_{fus}^2}, \qquad [15]$$

and $$\kappa_{fus} = \frac{\sigma_{cam}^2 \sigma_{fus}^2}{\sigma_{cam}^2 + \sigma_{fus}^2}. \qquad [16]$$

In an additional embodiment where radar curvature estimate $\sigma_{radar}^2$ is available, the fused curvature may be determined by the following.

$$\kappa_{fus} = \frac{\sigma_{radar}^2 \kappa_{fus} + \sigma_{fus}^2 \kappa_{radar}}{\sigma_{radar}^2 + \sigma_{fus}^2} \qquad [17]$$

And the fused curvature with the variance $\sigma_{fus}^2$ may be determined using the following.

$$\kappa_{fus} = \frac{\sigma_{radar}^2 \sigma_{fus}^2}{\sigma_{radar}^2 + \sigma_{fus}^2} \qquad [18]$$

In the above equations, variance $\sigma_{map}^2$, $\sigma_{yaw}^2$, and $\sigma_{cam}^2$ represent the confidence of the curvature information from different sources: map, in-vehicle sensor, and camera, respectively. The higher the variance of an information source, the less contribution of this source to the fused curvature. Some heuristic rules are employed to choose different weights for the three sources. For example, when yaw rate is high, we will choose small $\sigma_{yaw}^2$ to derive the fused curvature. In this way, fused particle points for navigation of the vehicle can be generated.

Figure 6:
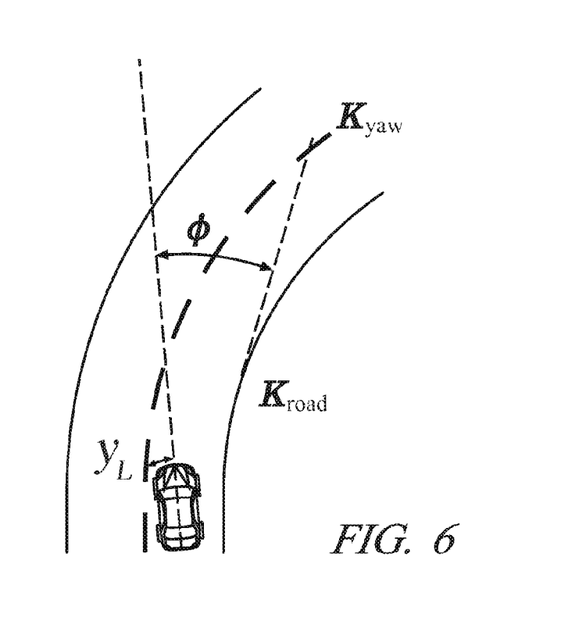
FIG. 6 illustrates an exemplary determination made within the lateral model of the vehicle, in accordance with the present disclosure.

Vehicle position with relation to the road geometry can be improved to include vehicle orientation and lateral position within a lane of travel in order to control the vehicle upon the road surface. As described above, the vehicle lateral tracking module inputs camera data, vehicle kinematics data, and K and outputs data regarding the position of the vehicle with respect to the center of the current lane and the angular orientation of the vehicle with respect to the present forward direction of the lane. FIG. 6 illustrates an exemplary determination made within the lateral model of the vehicle, in accordance with the present disclosure. The vehicle lateral tracking module monitors the inputs of vehicle kinematics (wheel speed v and yaw rate ω) and the inputs of lane sensing parameters. A Kalman filter can be utilized to integrate the data from vehicle kinematics and the lane sensing device. As shown in FIG. 6, the lateral offset $y_L$ is the displacement from the center of the lane. $K_{road}$ is the estimated curvature of the road. $K_{yaw}$ is the curvature estimated by the instantaneous vehicle path, i.e., $K_{yaw}$=ω/v. The measurement equation of the Kalman filter is expressed as b=Φ and a=$y_L$. A gating logic is implemented if the innovation error is larger than a threshold. In other words, if the difference between predicted and actual measurements is larger than a threshold, we ignore the actual measurement at the current time instant.

Figure 7:
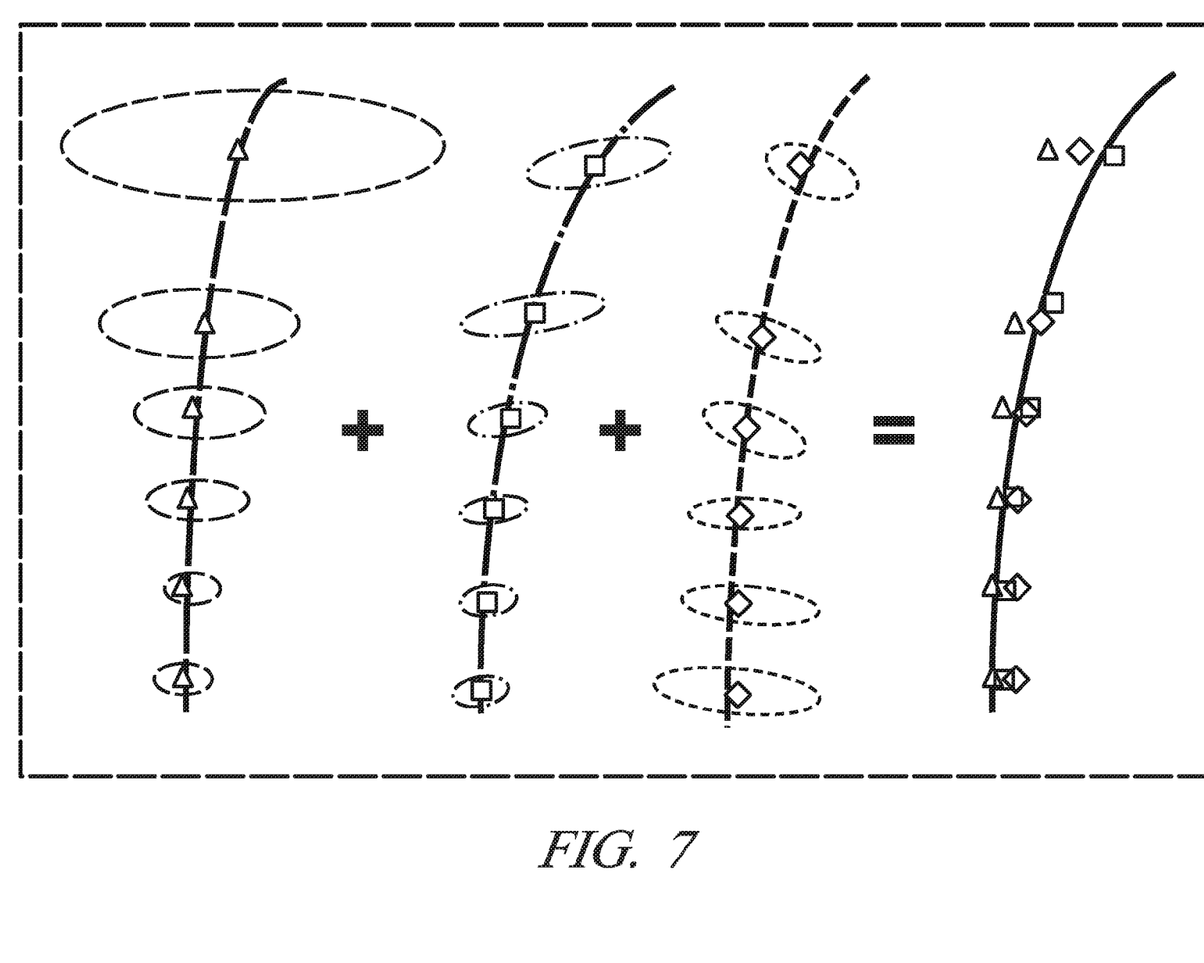
FIG. 7 illustrates exemplary sets of particle points including a fused set of particle points used to navigate the vehicle, in accordance with the present disclosure.

The above methods can be utilized to describe a road geometry and a vehicle position with relation to the road geometry. Such navigational commands can include a number of exemplary embodiments. FIG. 7 illustrates exemplary sets of particle points including a fused set of particle points used to navigate the vehicle, in accordance with the present disclosure. Each set of particle points represents a potential path of travel for the vehicle determined by a particular method, in this example, including vehicle kinematics, camera data, and map data. Circles surrounding each particle point depicted in FIG. 7 indicate a positioning variance on the path of travel for the particle points associated with each of the methods. The circle indicates an estimated variance of the particle point. A first set of particle points is determined based upon vehicle kinematics and is indicated by a triangle icon in the figure. A second set of particle points is determined based upon camera data from the vision subsystem and is indicated by a square icon in the figure. A third set of particle points is determined based upon map data from the map database and is indicated by a diamond icon in the figure. The fused set of particle points is determined based upon the first, second, and third set of particle points, including modifying the effect of each particle point according to its variance, using methods described herein above or known in the art. It will be appreciated that the fused set of particle points represents a projected path of travel for the vehicle.

Figure 8:
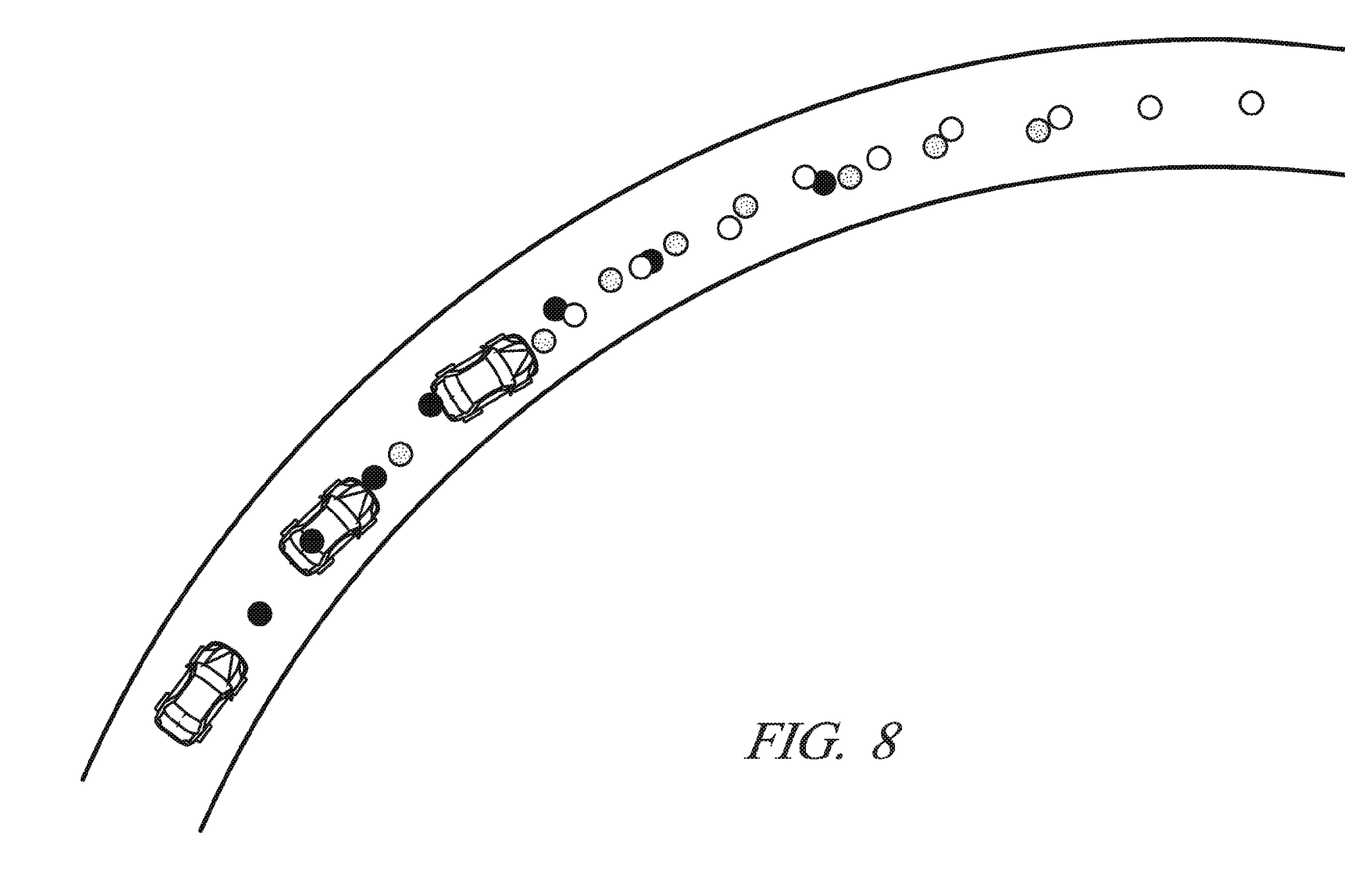
FIG. 8 illustrates an exemplary use of particle points along a projected lane in front of the vehicle to estimate lane geometry, in accordance with the present disclosure.

FIG. 8 illustrates an exemplary use of particle points along a projected lane in front of the vehicle to estimate lane geometry, in accordance with the present disclosure. Iterative creations of particle points at successive time intervals, the particle points spaced in short distance increments, can be used to reinforce the estimated lane geometry in front of the vehicle. Multiple iterative creation of particle points increase confidence in a projected path of travel generated from a plurality of potential paths of travel by including particle points created based upon using a variety of vehicle perspectives, by reinforcing multiple calculations, and by permitting filtering of particle point aberrations. As the vehicle traverses passed particle points, the particle points can be disregarded and only particle points corresponding to the projected route of travel untraversed by the vehicle are utilized. In this way, a projection of particle points in front of the vehicle along an estimated path can be utilized to estimate lane geometry through which the vehicle is likely to travel.

It will be appreciated, as described with reference to FIGS. 7 and 8, that the potential paths of travel for the vehicle include multiple particle points descriptive of a potential safe passage for vehicle travel. The potential paths of travel can be combined or fused in one of more different combinations to determine a projected path of travel for the vehicle. In one embodiment, the potential paths of travel may be combined using weights to determine a projected path of travel for the vehicle. For example a potential path of travel for the vehicle determined using global positioning/digital map data may be given greater weight than a potential path of travel determined using vehicle kinematics in predetermined situations.

The methods described above utilize exemplary methods of lane geometry determination and vehicle position determination including sensor inputs based upon vehicle kinematics, camera or vision system data, and global positioning/digital map data. In an additional embodiment, radar data may be used in combination or alternatively to the sensor inputs described herein above.

Figure 9:
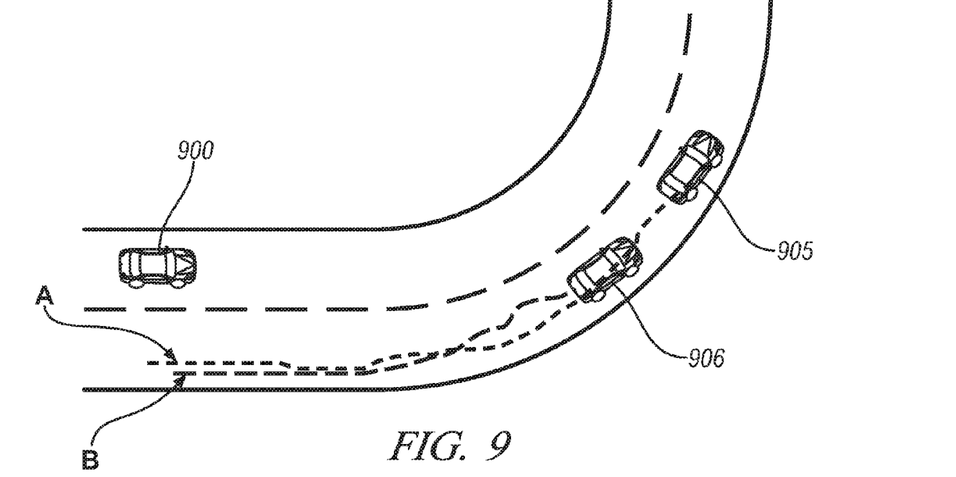
FIG. 9 illustrates use of exemplary tracked vehicle trails in a roadway determined using radar data, in accordance with the present disclosure.

FIG. 9 illustrates use of exemplary tracked vehicle trails in a roadway determined using radar data, in accordance with the present disclosure. The tracked vehicle trails are determined using the radar curvature estimate described herein above, and may be determined using an exemplary control scheme described herein below. FIG. 9 shows a host vehicle 900 and a first vehicle 905 and a second vehicle 906. Estimated tracked vehicle trails A and B are illustrated following the first and second vehicles 905 and 906.

Figure 10:
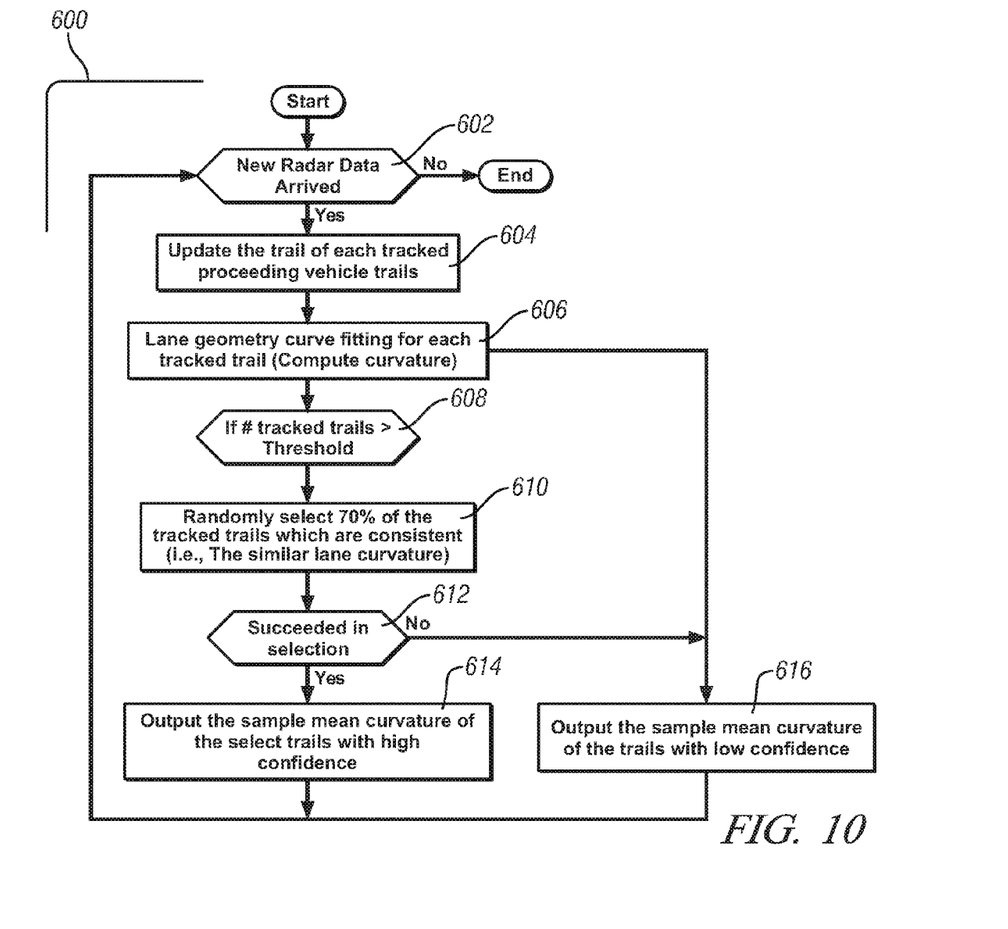
FIG. 10 is a flow chart depicting an exemplary control scheme for determining curvature of selected tracked vehicle trails, in accordance with the present disclosure.

FIG. 10 is a flow chart depicting an exemplary control scheme 600 for determining curvature of selected tracked vehicle trails, in accordance with the present disclosure. The control scheme 600 is illustrated in FIG. 10, and described herein as including discrete elements. Such illustration is for ease of description and it should be recognized that the functions performed by these elements may be combined in one or more devices, e.g., implemented in software, hardware, and/or application-specific integrated circuitry. The control scheme 600 is utilized when new radar data is obtained 602 by the host vehicle. The new radar data is used to update the vehicle trail of each tracked proceeding vehicle trail 604 as described herein below with respect to FIG. 11. Lane geometry curve fitting is estimated using each tracked vehicle trail 606.

Given a tracked vehicle trail represented by N point $\{(x_1, y_1), (x_2, y_2), \ldots (x_n, y_n)\}$ a parabolic model, e.g., $ax^2+bx+c=y$, may be used to fit the N points, which can be derived by minimizing residue of an over-constrained linear equation, A $\alpha$=b, where:

$$A = \begin{bmatrix} x_1^2 & x_1 & 1 \\ x_2^2 & x_2 & 1 \\ \vdots & \vdots & \vdots \\ x_N^2 & x_N & 1 \end{bmatrix}, b = \begin{bmatrix} y_1 \\ y_2 \\ \vdots \\ y_N \end{bmatrix}, \text{ and } \alpha = \begin{bmatrix} a \\ b \\ c \end{bmatrix} \quad [19]$$

The solution is $\alpha=(A^TA)^{-1}A^Tb$, where an estimated curvature for a tracked vehicle trail is 2a.

After estimating lane geometry each tracked vehicle trail is compared with a predetermined threshold 608. A predetermined number or percentage, e.g., 70%, of the tracked vehicle trails greater than the predetermined threshold are selected based upon consistent associated lane curvature 610 and 612. If the predetermined percentage of tracked vehicle trails are available, the control scheme 600 outputs a sample mean curvature of all the tracked vehicle trails with a high confidence 614. If the predetermined percentage of tracked vehicle trails are not available, the control scheme 600 outputs a sample mean curvature of all the tracked vehicle trails with a low confidence 616. In this way, a set of tracked vehicle trails can be analyzed and used to generate a curvature for use in methods described herein.

Figure 11:
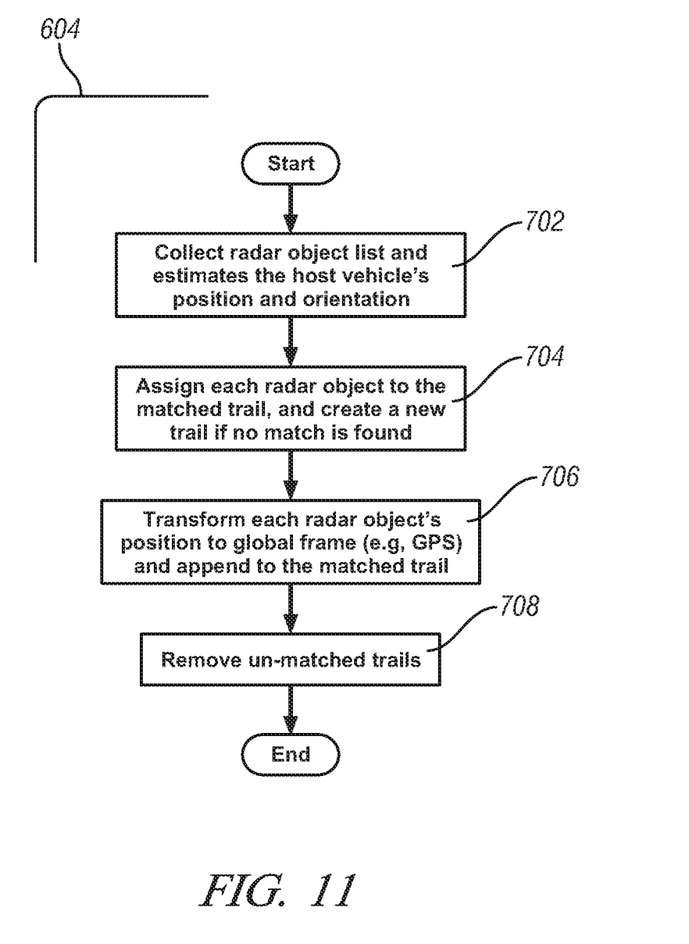
FIG. 11 is a flow chart for determining the tracked vehicle trails using radar data, in accordance with the present disclosure.

FIG. 11 is a flow chart for determining the tracked vehicle trails using radar data, in accordance with the present disclosure. The tracked vehicle trails may be determined using the exemplary control scheme 600 described herein above at step 604. Step 604 is illustrated in FIG. 11, and described herein as including discrete elements. Such illustration is for ease of description and it should be recognized that the functions performed by these elements may be combined in one or more devices, e.g., implemented in software, hardware, and/or application-specific integrated circuitry. Objects in view of vehicle radar device are identified and collected and vehicle position and orientation are estimated using the radar data 702. Each identified object is assigned to a matched vehicle trail 704. If no vehicle trail matches a new vehicle trail may be created. The identified object position is transformed to a global coordinate system, e.g., global position system coordinates, and appended to the tracked vehicle trails 706. Tracked vehicle trails without identified objects are removed from tracking 708.

The methods described above utilize exemplary methods of lane geometry determination and vehicle position determination including sensor inputs based upon vehicle kinematics, camera or vision system data, and global positioning/digital map data. However, it will be appreciated that different or additional combinations of sensor inputs can be utilized, for example, additionally or alternatively including radar data, LIDAR data, ultrasonic data, vehicle-to-vehicle communications, or vehicle-to-infrastructure communications. Vehicle-to-vehicle communication can be utilized to describe information such as a current position of another vehicle to the host vehicle or a path traveled by another vehicle over the roadway. Vehicle-to-infrastructure communications can be utilized to convey information such as directed traffic patterns, road geometry information, and localized offset information improving accuracy of global positioning data to the road geometry. Such combinations can be selected based upon a number of factors, including environmental conditions such as weather or light levels and the sensor inputs optimized for the current conditions. Additionally or alternatively, sensor inputs can be selected or added dynamically, based upon determined confidence in the determinations, for example, as embodied in the variance description above.

Real-time and dependable information regarding lane geometry and vehicle position and orientation in relation to the lane can be useful in a number of applications or vehicle control schemes. As described above, the information can be used in navigational control of the vehicle over the roadway. In other examples, such information can be used in vehicle operation applications including lane keeping, headlight modulation, improved navigation aids, and drowsiness alarms. However, one having ordinary skill in the art will appreciate that a great number of applications can utilize such information, and the disclosure is not intended to be limited to the particular embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for estimating a projected path of travel for a vehicle on a road, the method comprising:
    monitoring a plurality of sensor inputs;
    determining in a processor a road geometry in front of the vehicle based upon the monitored sensor inputs, the road geometry in front of the vehicle comprising
        a road curvature determined by fusing radar based curvature, map based curvature, camera based curvature and yaw rate based curvature, the radar based curvature determined by
            tracking one or more target vehicles in front of the vehicle to obtain a tracked trail for each target vehicle,
            comparing each tracked trail to a curvature threshold, and
            generating a sample mean curvature based on each tracked trail that exceeds the curvature threshold, and
        a tangent at the vehicle position;
    determining a vehicle position in relation to the road geometry based upon the monitored sensor inputs comprising
        determining a vehicle orientation in relation to the road geometry based upon the monitored sensor inputs and the road curvature, and
        determining a vehicle lateral position in relation to the road geometry based upon the monitored sensor inputs and the road curvature;
    determining a plurality of particle points in front of the vehicle representing a potential path of travel from the road geometry and the vehicle position; and
    utilizing iteratively determined ones of the plurality of particle points to navigate the vehicle including omitting ones of the plurality of particle points passed by the vehicle.

2. The method of claim 1, wherein determining the plurality of particle points in front of the vehicle comprises:
    determining a plurality of particle points for each of a plurality of the sensor inputs; and
    fusing the plurality of particle points for each of the plurality of the sensor inputs to determine the plurality of particle points in front of the vehicle.

3. The method of claim 1, wherein utilizing iteratively determined ones of the plurality of particle points to navigate the vehicle comprises:
    determining the projected path of travel for navigation of the vehicle based upon the iteratively determined ones of the plurality of particle points.

4. The method of claim 1, wherein determining a vehicle lateral position in relation to the road geometry comprises:
    determining the vehicle lateral position in relation to a current lane center.

5. The method of claim 1, wherein monitoring the plurality of sensor inputs comprises:
    monitoring data from a mapping device; and
    monitoring data from at least one additional sensor input selected from the group consisting of a vision subsystem, a vehicle kinematic sensor, radar, LIDAR, a vehicle-to-vehicle communication system, and a vehicle-to-infrastructure communication system.

6. The method of claim 5, further comprising:
    iteratively updating the vehicle position when new data from at least one of the plurality of sensor inputs is monitored.

7. The method of claim 1, wherein the map based curvature is determined by:
    generating a spline describing road curvature in proximity of the vehicle; and
    determining the vehicle position upon the spline based upon the plurality of sensor inputs.

8. The method of claim 7, wherein generating the spline comprises:
    collecting map shape points from a map database; and
    fitting the map shape points with the spline.

9. The method of claim 8, wherein the map shape points are associated with a local coordinate system.

10. The method of claim 7, wherein monitoring the plurality of sensor inputs comprises monitoring a global positioning coordinate;
    wherein determining the vehicle position upon the spline comprises:
        determining an initial estimate of the vehicle position upon the spline based upon the plurality of sensor inputs;
        correcting the initial estimate of the vehicle position upon the spline based upon the global positioning coordinate.

11. The method of claim 1, wherein the plurality of particle points in front of the vehicle is based upon:
    a first set of particle points determined based upon vehicle kinematic data;
    a second set of particle points determined based upon camera data; and
    a third set of particle points determined based upon map data.

12. The method of claim 11, further comprising:
    fusing the first, second, and third sets of particle points into a single set of particles points representing the path of travel using a least squares estimation.

13. The method of claim 12, wherein fusing is executed based upon a position variance associated with each of the plurality of particle points.

14. The method of claim 1, wherein determining the vehicle position is executed using a Kalman filter.

15. Method for estimating a projected path of travel for a vehicle on a road, the method comprising:
- monitoring a plurality of sensor inputs describing a road geometry in front of the vehicle;
- determining in a processor a set of particle points for each of the sensor inputs, comprising:
  - determining the road geometry in front of the vehicle based upon the respective sensor input, the road geometry in front of the vehicle comprising
    - a road curvature determined by fusing radar based curvature, map based curvature, camera based curvature and yaw rate based curvature, the radar based curvature determined by
      - tracking one or more target vehicles in front of the vehicle to obtain a tracked trail for each target vehicle,
      - comparing each tracked trail to a curvature threshold, and
      - generating a sample mean curvature based on each tracked trail that exceeds the curvature threshold, and
    - a tangent at the vehicle position;
  - determining a vehicle position in relation to the road geometry based upon the respective sensor input comprising
    - determining a vehicle orientation in relation to the road geometry based upon the monitored sensor input and the road curvature, and
    - determining a vehicle lateral position in relation to the road geometry based upon the monitored sensor inputs and the road curvature; and
  - utilizing the road geometry and the vehicle position to determine the set of particle points for the respective sensor input representing a potential path of travel;
- fusing the sets of particle points for each of the sensor inputs into a set of fused particle points; and
- utilizing iterative determinations of the set of fused particle points to operate the vehicle, wherein utilizing iterative determinations comprises omitting individual particle points of the sets of fused particle points passed by the vehicle.

16. The method of claim 15, wherein fusing the sets of particle points comprises utilizing a least squares estimation.

17. The method of claim 15, wherein monitoring the plurality of sensor inputs comprises:
- monitoring data from a global positioning device;
- monitoring vehicle kinematics data from vehicle kinematic sensors; and
- monitoring camera data from a vision subsystem.

18. The method of claim 15, wherein fusing the sets of particle points is based upon a variance associated with each of the particle points for each of the sensor inputs.

* * * * *